April 8, 1969     E. B. NEITZEL     3,438,057
PHOTOGRAPHIC RECORDER USING AN ARRAY OF SOLID
STATE LIGHT EMITTERS
Filed Dec. 30, 1966

INVENTOR
EDWIN B. NEITZEL

ATTORNEY

United States Patent Office 3,438,057
Patented Apr. 8, 1969

3,438,057
PHOTOGRAPHIC RECORDER USING AN ARRAY OF SOLID STATE LIGHT EMITTERS
Edwin B. Neitzel, Dallas, Tex., assignor to Texas Instruments Incorporated, Dallas, Tex., a corporation of Delaware
Filed Dec. 30, 1966, Ser. No. 606,424
Int. Cl. G01d 9/42
U.S. Cl. 346—107                                      4 Claims

ABSTRACT OF THE DISCLOSURE

A seismic record section type recording system includes an elongated solid state light emitting array having control logic actuated by a plurality of seismic traces for parallel excitation at selected points along the array. The excitation is maintained primarily under the control of a clock pulse generator synchronized with movement of film past the linear array of light emitters. To produce a conventional record section which consists of from 200 to 1,000 oscillographic-type traces in any one of a plurality of modes including wiggle trace, variable intensity, variable area and combinations of the same, light emitters in number of the order of 16,000 are employed in the linear array.

FIELD OF THE INVENTION

This invention relates to a simultaneous recording of multichannel data through the parallel excitation of selected ones of a plurality of solid state light emitters mounted in a linear array in registration with a recording station on a photographic film wherein the excitation of the selected light emitters is controlled by clock pulses generated in synchronism with movement of the film past a recording station.

THE PRIOR ART

In seismic exploration, seismic traces have heretofore been recorded as a final processing step in one or the other of several widely used modes. The most frequently used mode leads to production of a wiggle trace record such as produced by spots of light reflected from galvanometers, the coils of which are excited by the output signals from seismic detectors.

In seismic exploration, operations are conducted along lines or traverses of such length as to provide sufficient data to delineate anomalies in the subsurface structure. In the past, multitrace seismic records have been obtained from locations spaced successively along a seismic traverse. The resultant records, recorded on a common time base, placed in side by side relation provide effectively a long line display of the subsurface bedding as indicated by reflection patterns on the various seismic records.

An improvement over such multi-record seismic sections involves the use of section plotters wherein a wide sheet of recording paper or photographic paper is clamped onto a drum with a recording unit having a stylus or galvanometer mounted for movement along the length of the drum to write successively on side by side sections of the paper. By this means a single record medium receives many seismic traces plotted thereon to form a record section. Representative of such plotters are the units manufactured and sold by SIE of Houston, Tex., and identified as SIE RA–12 Section Plotter. Further, Section Plotters series SP–112, manufactured and sold by Geo Space Corporation of Houston, Tex., are widely used.

SUMMARY

A writing system is provided for multichannel exposure of photographic film which includes drive means for moving the film past a recording station. A generator associated with the drive means produces clock pulses synchronized with the movement of the film past the recording station. An elongated linear array of solid state light emitters mounted adjacent to the film at the recording station extends transversely of the direction of movement of said film. Logic circuits, including an AND gate for each of the light emitters, selectively apply signal information in parallel to the emitters at spaced locations across said array in dependence upon, at times controlled by, the clock pulses.

THE DRAWINGS

THE PREFERRED EMBODIMENTS

Figure 1:
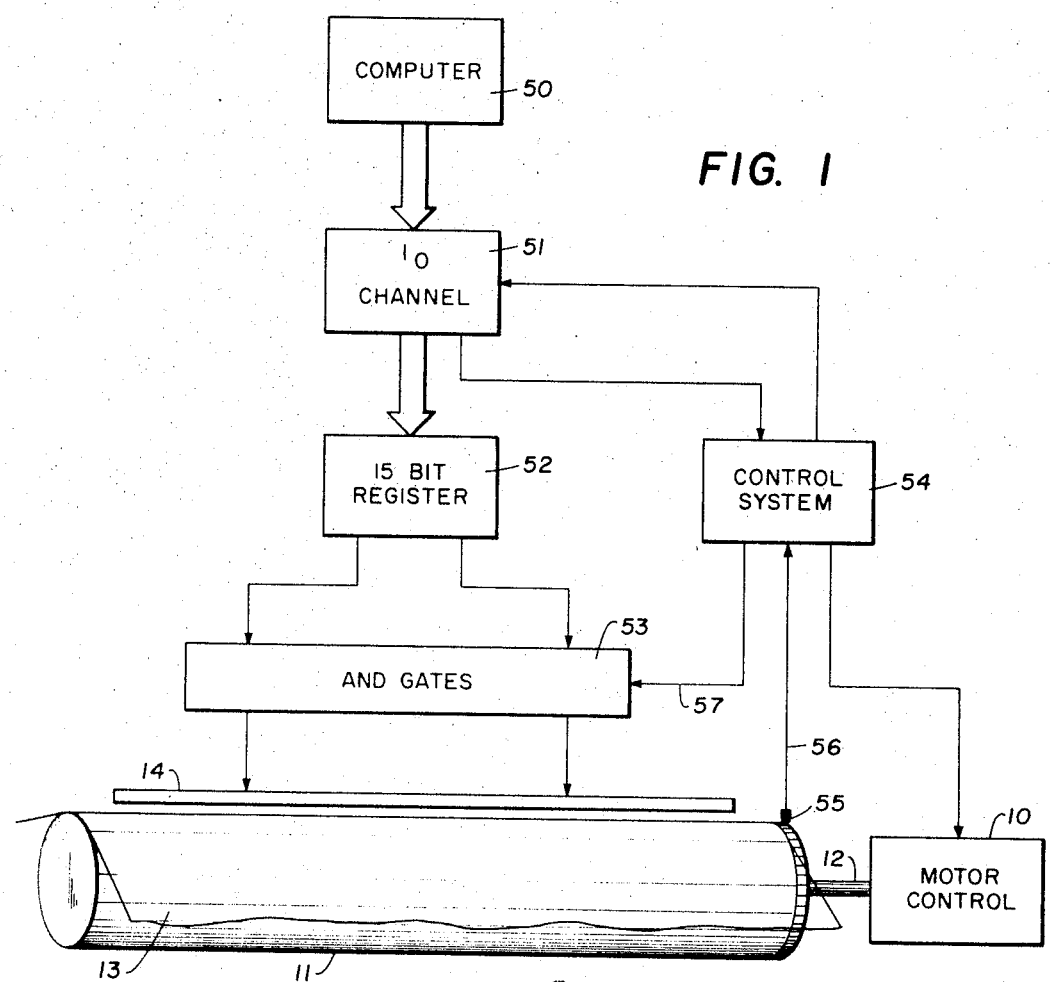
FIGURE 1 is a schematic diagram of the present invention.

Referring now to FIGURE 1 a system is illustrated for recording data of the type characterized as seismic record sections. In this system a motor control unit 10 drives a drum 11 by way of a shaft 12. A sheet of photographic film 13 is driven past a recording station by the drum 11. The recording station comprises the location of a line along the top of the drum. As the film 13 moves over the drum, it is exposed by light from a multi-element source array 14 mounted adjacent to drum 11.

Figure 2:
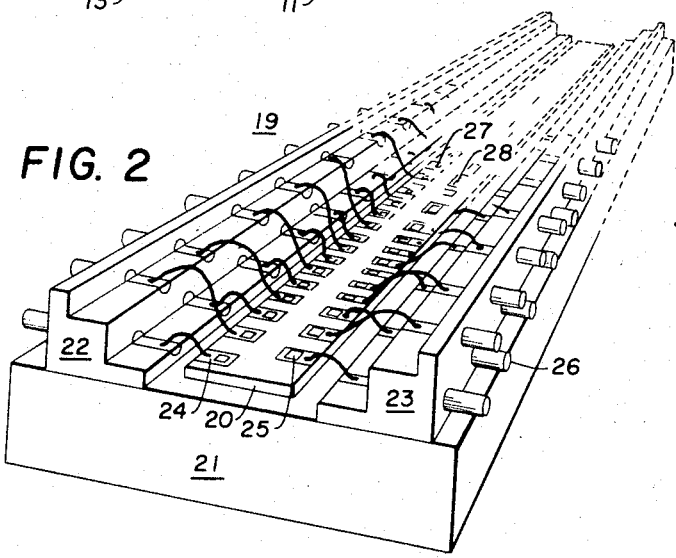
FIGURE 2 illustrates a multi-emitter array employed in accordance with the present invention.

The unit 14 in one form is of the type illustrated in FIGURE 2 wherein a substrate 20, for example gallium arsenide (GaAs), is mounted on a base 21 along with a pair of terminal blocks 22 and 23. The substrate 20 of n-type material has a plurality of p-type light emitting surfaces, such as the surfaces 24 and 25 diffused thereon. Thus there is provided an array of light emitting elements which may be actuated by application of suitable control potentials to the input terminal, such as the terminal 26 on block 23. In such embodiments, light emitters are dots 0.005 inch square on centers of 0.010 inch to form the line 27 which includes the unit 24. The line 28 would similarly be formed but with the locations of the light emitters staggered relative to the emitters of the line 27. Thus, a continuous line writing capability is provided. The array of FIGURE 2 may include, for example, one hundred such emitters on a block or substrate 20 approximately ½ inch in length.

The emitters, their construction and operation in general are well known. Suitable units are described in Electronic Design, Sept. 27, 1966, at p. 67 et seq. Miniaturization and integrated circuit technology have provided such emitters primarily in two-dimensional arrays. Such light sources may be individually modulated with a negligible turn on time as low as 50 nanoseconds. Such arrays have heretofore been used for alpha numerical displays with high speed print out capabilities.

Figure 3:
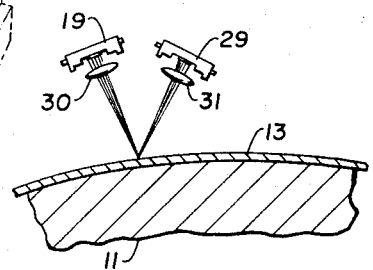
FIGURE 3 illustrates the mounting of a plurality of arrays to form a multi-element line of light sources.

In accordance with the present invention a plurality of such substrates mounted on a bolck such as block 21 are mounted along a line in the unit 14 of FIGURE 1 to provide capability for writing seismic record sections of from 200 to 1,000 traces on film 13. In such case the control of 1,000 traces on 20 to 40-inch film requires a total of about 16,000 light emitters. In order to provide a continuous line within the capabilities of current fabrication techniques, a plurality of units such as the unit 19 would be mounted in a staggered array such as shown in FIGURE 3 where one unit 19 would be mounted offset from a second unit 29 with lens 30 and 31 associated with units 19 and 29, respectively, for focusing the light onto the same line extending across the film 13.

It will be recognized that it is easier to fabricate light emitters on a single slab with close spacing from one emitter to another than to maintain the same uniformity in spacing at the ends of two separate though adjacent subtrates. Further, it is difficult, if not impossible under the present state of technology, to provide a substrate a structure composed of a single piece of semi-conductor material which would span the entire width of a 20-inch or a 40-inch photographic film. Thus, a plurality of units 19, such as shown in FIGURE 2, will be mounted in staggered relationship to form an effectively continuous array of solid state light emitters along the line of the recording station in the manner shown in FIGURE 3, to provide continuous line writing capability.

In accordance with the present invention, the display provides for writing a complete section on a multiplexed basis. More particularly, seismic traces are multiplexed as disclosed in Foote Patent No. 3,134,957 and processed by a computer such as computer 50 of the type described in Patent No. 3,074,636 to Baker et al. A multichannel I/O channel 51 in the computer feeds a 15-bit register 52.

The register 52 controls a bank of AND gates 53. A 15-input AND gate is employed for each light emitter. Signals from a control system 54 are provided for the I/O channel 51 and for the AND gates 53. The signals are then recorded through energization of the selected light emitters in the unit 14 under the control of clock pulses generated by a unit 55 which is coupled by way of channel 56 to the control unit 54. The clock pulses are applied by way of channel 57 to all of the AND gates in the bank 53. The generating unit 55 is driven by and/or synchronized with the drum 11 which drives the film past the recording station.

The computer 50 with I/O channel 51 may be of the type manufactured and sold by Texas Instruments Incorporated of Dallas, Tex., and identified as TIAC Model 827, Automatic Computer, described along with programming instructions in Program Instruction Manual No. 180050–2, Texas Instruments Incorporated, 1964.

In accordance with one mode of operation, data words are provided from the computer 50 by way of the I/O channel 51 at the rate of 64 thousand words per second. The I/O channel 51 then provides for demultiplexing the data from computer 50 and applies the demultiplexed data to the register 52 to condition the AND gates 53 so that upon each pulse from the generator 55, selected ones of the light emitters in unit 14 are energized to expose the film 13 selectively.

What is claimed is:

1. Apparatus for recording by multichannel exposure of photographic film, seismic exploration data and the like where one or more signals vary along time related abscissae which comprises in combination:
    (a) drive means comprising a drum for moving said film continuously past a linear recording station arranged transversely to the direction of travel of the film,
    (b) generator means synchronized with movement of the film by said drive means for producing and transmitting clock pulses to said station,
    (c) an array of solid state light emitters mounted adjacent said film, said emitters being arranged along two parallel lines with the locations of the emitters of the second line being staggered relative to the locations of the emitters of the first line, said array extending over a linear extent equivalent to the width of said film onto which data is to be recorded,
    (d) means to focus the light from said emitters onto said film so that a continuous line writing capability is provided on said film, and
    (e) logic means controlled by said clock pulses for each of said emitters for selective parallel application of signal information to said emitters, whereby said film is selectively exposed along said linear station to produce a plurality of traces thereon.

2. Apparatus for recording seismic exploration data and the like by multichannel exposure of photographic film, which comprises in combination:
    (a) drive means comprising a drum for moving said film continuously past a linear recording station arranged transversely to the direction of travel of the film,
    (b) generator means synchronized with movement of the film by said drive means for producing and transmitting clock pulses to said station,
    (c) a line of solid state light point source emitters mounted adjacent to said film along said linear recording station,
    (d) means to focus light from all said sources to a line at the surface of said film with said sources being in number and spacing continuously to span the recording width of said film, and
    (e) logic means controlled by said clock pulses and including an AND gate for each of said light emitters for selective parallel application of signal information to said emitters, whereby the film is selectively exposed along said linear station to produce a plurality of traces thereon.

3. Apparatus according to claim 2 wherein the pulse generator is secured to and operated by said drive means.

4. Apparatus for recording seismic exploration data and the like by multichannel exposure of photographic film, which comprises in combination:
    (a) drive means comprising a drum for moving said film continuously past a linear recording station arranged transversely to the direction of travel of the film,
    (b) generator means synchronized with movement of the film by said drive means for producing and transmitting clock pulses to said station,
    (c) an array of solid state light emitters mounted adjacent said film and along said linear station and arranged with multiple emitters in a single block with a plurality of said blocks mounted in consecutively staggered relationship to cover said station effectively continuously over a linear extent equivalent to the width of said film, and
    (d) logic means controlled by said clock pulses and including an AND gate for each of said light emitters for selective parallel application of signal information to said emitters, whereby the film is selectively exposed along said linear station to produce a plurality of traces thereon.

References Cited

UNITED STATES PATENTS

| | | | |
|---|---|---|---|
| 2,735,049 | 2/1956 | De Forest | 317—235 |
| 3,139,319 | 6/1964 | Mellon | 346—107 X |
| 3,196,445 | 7/1965 | Trolio | 346—107 X |
| 3,308,452 | 3/1967 | Michel et al. | 340—324 |
| 3,341,857 | 9/1967 | Kabell | 346—107 |

RICHARD B. WILKINSON, *Primary Examiner.*

JOSEPH W. HARTARY, *Assistant Examiner.*

U.S. Cl. X.R.

313—108